J. STONE.
VALVE.
APPLICATION FILED SEPT. 19, 1907.

957,012.

Patented May 3, 1910.

ATTEST
E. M. Fisher
F. E. Measure

INVENTOR
James Stone.
By Fisher & Moser ATTYS.

UNITED STATES PATENT OFFICE.

JAMES STONE, OF CLEVELAND, OHIO.

VALVE.

957,012. Specification of Letters Patent. Patented May 3, 1910.

Application filed September 19, 1907. Serial No. 393,620.

*To all whom it may concern:*

Be it known that I, JAMES STONE, a citizen of the United States, residing at Cleveland, in the county of Cuyahoga and State of Ohio, have invented certain new and useful Improvements in Valves, and do declare that the following is a full, clear, and exact description of the invention, which will enable others skilled in the art to which it appertains to make and use the same.

My invention relates to improvements in valves adapted to be variously used where oil or other fluid or liquid is carried through a pipe or other tubular connection by artificial or other pressure and the function of a check-valve, or the like, is required, all substantially as shown and described and particularly pointed out in the claims.

Figure 1:
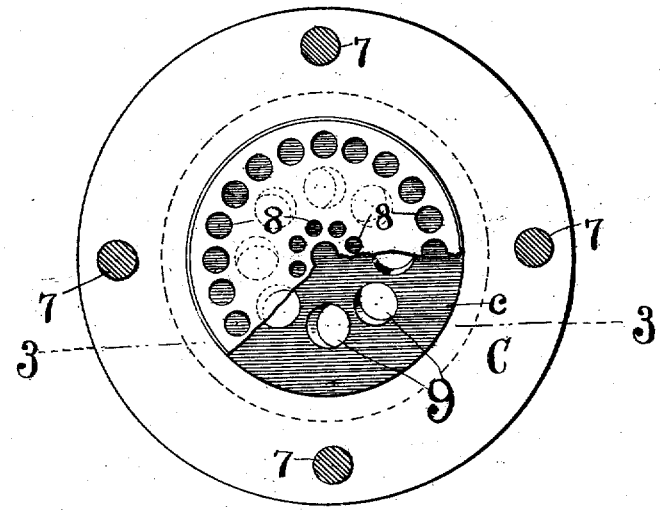
Figure 2:
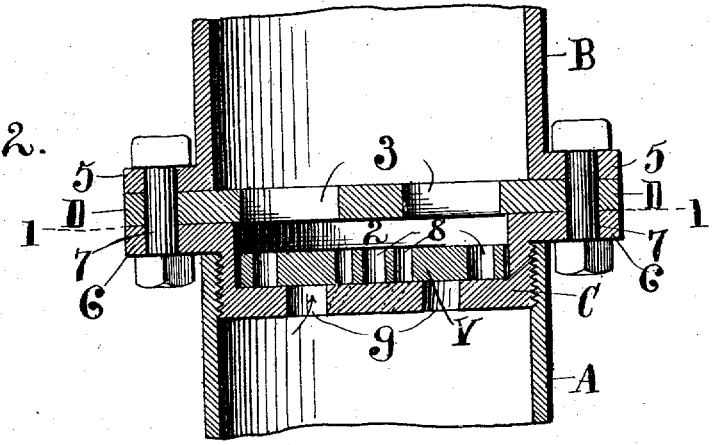
Figure 3:
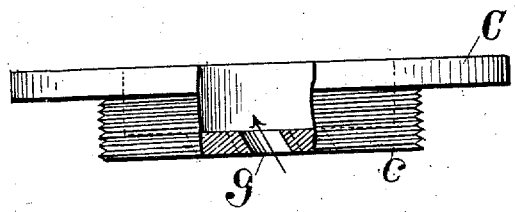

In the accompanying drawings, Figure 1 is a plan view on line 1—1, Fig. 2, showing the valve disk partially broken away and disclosing some of the inlet passages beneath. Fig. 2 shows a section of a pipe coupling or casing embodying my invention, and Fig. 3 is a side elevation of the coupling member provided with a valve chamber and broken away at the front to show the inclination of the inlet passages, as hereinafter fully described.

As thus shown A and B respectively represent end sections or portions of two pipes or tubes adapted to be used wherever liquid or fluid of any kind is to be conveyed, whether it be water, oil, air, gas or the like, and my improved valve mechanism is located in the coupling or casing between these parts and adapted to prevent back flow by pressure, gravity or suction. To these ends I provide a coupling member C of substantially dish shape, in this instance, and which is formed with a circular chamber 2 constituting the valve chamber and adapted to receive disk valve V operative therein throughout said chamber. The wall of said chamber is threaded externally and screwed into the correspondingly threaded end of pipe or tube A to couple therewith, and flange 6 forms the rim of said member. A plain guard or stop plate D of disk pattern is interposed over said chamber and engaged about its edge between the respective coupling flanges 5 and 6, all of which are bolted together by bolts 7, and said disk D has large openings 3 which permit a free flow of the fluid through the same, and said disk is intended more especially as a stop or guard for valve V as it is pressed forward and opened under pressure from the opposite side. This forms a comparatively narrow or shallow valve chamber and reduces the space required for operation to the minimum. Obviously, the positions of said parts C and D might be reversed and serve the same purpose, if the flow through the same were reversed also.

Valve V is of disk form and of a size to comfortably occupy chamber 2 but is left perfectly free from all engagement about its edge so that it can turn or rotate as well as play back and forth in respect to its seat on side *c* and stop member D. That is to say, when the valve is in closing or seating position it rests against or upon seat *c* regardless of the working position of the pipe or coupling, whether vertical, horizontal, or otherwise, because in any case the back pressure upon the valve is supposed to be sufficient to maintain it upon its seat. Of course, as shown herein, gravity alone would seat the valve in the absence of pressure to lift it, assuming that the pipes are in a vertical position.

Now, in order that the parts may operate as designed, the valve is provided with a circle of perforations or passages 8, and the bottom of the valve chamber with a circle of passages 9, and these two sets of passages are so arranged in respect to each other that the passages in one will always come against the land or solid portion of the other regardless of the rotation or position of the valve in its chamber. Obviously, the particular disposition or arrangement of the said perforations 8 and 9 might be reversed as to positions relative to the center, and be otherwise changed and yet retain the non-registering feature, so that my invention comprises any arrangement of perforations or passages in or through said parts which will give the present effect or result and allow the valve to rotate independently and yet effectually close the passages against back flow of the liquid. As shown I provide valve V with an outer circle of perforations of a given size and a series of smaller ones at its center, while chamber inlet side or diaphgram *c* has larger perforations or passages 9 as compared with perforations 8, arranged on a shorter radius and wholly between the inner and outer passages 8 in said valve so as to be covered by the stock between them. Hence, however the valve may be turned, it will cover passages 9 and effect a perfect seal. The sizes of said several passages are not material provided they have the requisite aggregate area.

Again, passages 8 are directly or straight through said valve, while passages 9 are diagonal or inclined to an axial line about as shown, and all are inclined in the same direction successively around the circle. It follows that the fluid passing through the same will impinge against valve V at an angle and produce a whirlpool effect in the chamber beneath it, thereby changing the position of the valve at every lift from its seat and also thoroughly cleansing or scouring the valve chamber and keeping it clean. It follows that the valve does not seat twice alike and always seats evenly over its entire surface.

It will be observed that there is no packing and no special fitting at any point in this construction as valves usually are required to have to seat closely, but simply a plain flat surface on the valve matching a flat surface in the valve chamber. The valve itself may be made of any suitable material but I prefer a non-corrosive metal rather than rubber or the like, which may be more or less injuriously affected by the fluids or liquids handled, hot or cold, and hence may be rendered unserviceable. But non-corrosive metal is durable and practically indestructible and requires no repairs, and is especially desirable for under ground work and all inaccessible or difficult locations.

Then again I avoid the use of springs or other means ordinarily employed for seating valves, and require no special guide, such as a pin or spindle, as the wall of the chamber serves as a guide therefor. Guard plate D is at the most a mere webbing, so as to interpose no material obstruction to the flow of fluid through the parts.

What I claim is:

1. A valve chamber having a diaphragm on one side provided with a series of diagonal inlet passages, a free disk shaped valve in said chamber having fluid passages through the same on a different radius from said inlet passages, and a fixed opposite diaphragm having passages registering with those in said valve.

2. A valve chamber having at its bottom a dish shaped member C provided with a series of diagonal inlet passages in a circle and a disk shaped valve free to rotate in said chamber and having open passages in a circle out of the radius of said inlet passages and said valve adapted to seat over and close said inlet passages and a diaphragm D over the top of said member C having passages registering with those of said valve.

In testimony whereof I sign this specification in the presence of two witnesses.

JAMES STONE.

Witnesses:
E. M. FISHER,
F. C. MUSSUN.